(12) United States Patent
Shibuya et al.

(10) Patent No.: US 8,596,987 B2
(45) Date of Patent: Dec. 3, 2013

(54) ELECTRIC COMPRESSOR CONTROL DEVICE

(75) Inventors: Makoto Shibuya, Kiryu (JP); Daisuke Hirono, Isesaki (JP)

(73) Assignee: Sanden Corporation, Isesaki-Shi, Gunma (JP)

( * ) Notice: Subject to any disclaimer, the term of this patent is extended or adjusted under 35 U.S.C. 154(b) by 215 days.

(21) Appl. No.: 12/663,495

(22) PCT Filed: May 27, 2008

(86) PCT No.: PCT/JP2008/059703
§ 371 (c)(1),
(2), (4) Date: Dec. 7, 2009

(87) PCT Pub. No.: WO2008/149721
PCT Pub. Date: Dec. 11, 2008

(65) Prior Publication Data
US 2010/0172765 A1    Jul. 8, 2010

(30) Foreign Application Priority Data
Jun. 6, 2007 (JP) .................. 2007-150056

(51) Int. Cl.
*F04B 49/00* (2006.01)
(52) U.S. Cl.
USPC ......... 417/18; 417/44.2; 417/44.11; 417/44.1
(58) Field of Classification Search
USPC ............... 417/18, 44.1, 45, 44.2, 44.11, 321, 417/410.1
See application file for complete search history.

(56) References Cited

U.S. PATENT DOCUMENTS

| | | | | |
|---|---|---|---|---|
| 2005/0210900 A1* | 9/2005 | Oomura et al. | ............... | 62/228.1 |
| 2007/0035272 A1* | 2/2007 | Hattori et al. | ................. | 318/823 |
| 2007/0237648 A1* | 10/2007 | Ooya | ................. | 417/19 |
| 2009/0041598 A1* | 2/2009 | Saito et al. | ................ | 417/410.1 |
| 2010/0064706 A1* | 3/2010 | Hattori et al. | .................. | 62/157 |

FOREIGN PATENT DOCUMENTS

| JP | 2006200507 A | * | 8/2006 |
|---|---|---|---|
| JP | 2007151318 A | * | 6/2007 |

OTHER PUBLICATIONS

Machine translation of JP2006200507A.*
Derwent abstract of JP2006200507A.*
Machine translation of JP2006200507A, published Aug. 2006.*
Derwent abstract of J P2006200507A, published Aug. 2006.*

* cited by examiner

*Primary Examiner* — Peter J Bertheaud
*Assistant Examiner* — Thomas Fink
(74) *Attorney, Agent, or Firm* — Baker Botts L.L.P.

(57) ABSTRACT

A device controls power supplied from an inverter having a semiconductor switching element to an electric compressor having an external drive source or a built-in motor. The device includes: an apparatus for calculating a starting current value required for starting the compressor from the pressure at the discharge side circuit of the compressor; an apparatus for calculating a permitted current value of the semiconductor switching element from the temperature of the inverter installation portion; and an apparatus for comparing the calculated compressor starting current value to the permitted current value of the semiconductor switching element so as to determine whether to permit a start of the compressor.

4 Claims, 3 Drawing Sheets

ELECTRIC COMPRESSOR CONTROL DEVICE

CROSS-REFERENCE TO RELATED APPLICATIONS

This application is the National Stage of International Patent Application No. PCT/JP2008/059703, filed May 27, 2008, which claims the benefit of Japanese Patent Application No. 2007-150056, filed Jun. 6, 2007, the disclosures of which are incorporated herein by reference in their entirety.

TECHNICAL FIELD

The present invention relates to a device which controls an electricity input from an inverter into an electric compressor, and specifically, to a control device of an electric compressor considering the startup electric current of the electric compressor.

BACKGROUND ART OF THE INVENTION

For driving an electric compressor having a built-in motor, such a method is often employed that electric current from a DC power source is transformed by an inverter having a semiconductor switching element into pseudo-AC voltage so that the transformed electric current is supplied into the built-in motor of the compressor. The electric current in startup for the electric compressor is often required to be higher than the one at the other case, where the electric current is usually so output from the inverter that the electric compressor is started by the motor electric current which can output the maximum torque required for the startup of the electric compressor (for example, Patent document 1).

The above-described inverter is often affected directly by the temperature of the electric compressor, because it is sometimes incorporated integrally into the electric compressor and sometimes mounted in the neighborhood of the electric compressor. Therefore, when temperature of the electric compressor is high, temperature of the inverter becomes high and temperature of the semiconductor switching element built in the inverter also becomes high. When the semiconductor switching element is at high temperature, its own permitted electric current generally becomes small. Therefore, considering the compressor startup at a high temperature, semiconductor switching whose permitted electric current is rather great should often be used. Use of the semiconductor switching element with a great permitted electric current makes the inverter grow in size and cost, and therefore, makes the built-in inverter type electric compressor grow in size and cost, and even if the inverter is mounted separately with the compressor the compressor as an apparatus including the inverter grows in size or cost.

Patent document 1: JP-A-2006-200507

DISCLOSURE OF THE INVENTION

Problems to be solved by the Invention

Accordingly, paying an attention to the above-described problems, an object of the present invention is to provide an electric compressor control device which can properly start the electric compressor without using a semiconductor switching device whose permitted electric current is rather great, so as to be able to prevent the electric compressor from growing in size and cost.

Problems to be Solved by the Invention

To solve the above-described problems, an electric compressor control device according to the present invention is a control device which controls an electric power supply from an inverter having a semiconductor switching element to an electric compressor having a built-in motor, comprising: means for calculating a starting current value required for starting the compressor from a pressure at a discharge side circuit of the compressor, the starting current value having a correlation with the pressure; means for calculating a permitted current value of the semiconductor switching element from a temperature at an inverter installation portion, the permitted current value having a correlation with the temperature, and a start permissibility determination means for determining whether to permit a start of the compressor by comparison between the calculated starting current value for the compressor and the permitted current value for the semiconductor switching element.

In such an electric compressor control device, the torque required for the startup of the electric compressor is calculated from a pressure in a discharge side circuit of the compressor (high-pressure side pressure), and the starting current value required for the output of the required torque (motor phase current value) is calculated. On the other hand, from the temperature of the inverter installation portion, the permitted current value of the semiconductor switching element is calculated being based on the predetermined characteristics which show the relation between temperature and the permitted current value. And, the magnitude relation between the calculated starting current value of the compressor and permitted current value of the semiconductor switching element is determined by the start permissibility determination means, and the startup of the electric compressor is permitted to start if the calculated starting current value is smaller than the calculated permitted current value of the semiconductor switching element (namely, within a permitted range). If it is being out of the permitted range, it is determined that the startup should not be permitted, so that the compressor keeps stopping until it comes within the permitted range. Therefore, the electric compressor is started only when the electric current supplied into the semiconductor switching element is surely below the permitted current value, so that it becomes unnecessary to use the semiconductor switching element whose electric current capacity is great, and therefore, compact and inexpensive semiconductor switching elements can be used.

The electric compressor control device according to the present invention can be applied in both cases that the inverter is incorporated integrally into the electric compressor and that the inverter is installed separately from the electric compressor nearby, where the above-mentioned problems by the thermal influence from the compressor into the inverter can be resolved properly.

Further, when the start permissibility determination means determines to permit the start of the compressor for an actual startup of the electric compressor, the compressor may be started by an electric current of the calculated starting current value, or alternatively, the compressor may be started by an electric current of the calculated permitted current value. In the latter case, the startup can be surely performed because the permitted current value is necessarily greater than the starting current value as calculated above, or at least equal to it. In the former case, because the compressor is started by the minimum current required for starting the compressor in the present condition, the electricity consumption at the time of the startup can be minimized.

Further, the electric compressor in the present invention is the concept which includes not only a general electric compressor incorporating a motor for the drive of the compressor, but also a hybrid-type compressor which is driven selectively or simultaneously by the built-in motor and an external drive source other than the motor (such as an engine for vehicle travel or a motor for vehicle travel in electric vehicles or hybrid vehicles).

Furthermore, the electric compressor control device according to the present invention is suitable especially as a compressor which is incorporated into a refrigeration circuit of an air conditioning system for vehicles.

[An Effect of the Invention]

In the electric compressor control device according to the present invention, an electric compressor can be started properly and surely without using a semiconductor switching element having rather great current capacity, and the use of a compact and inexpensive semiconductor switching element makes it possible to prevent the electric compressor from the growth in size and the increase in cost.

EFFECT ACCORDING TO THE INVENTION

Figure 1:
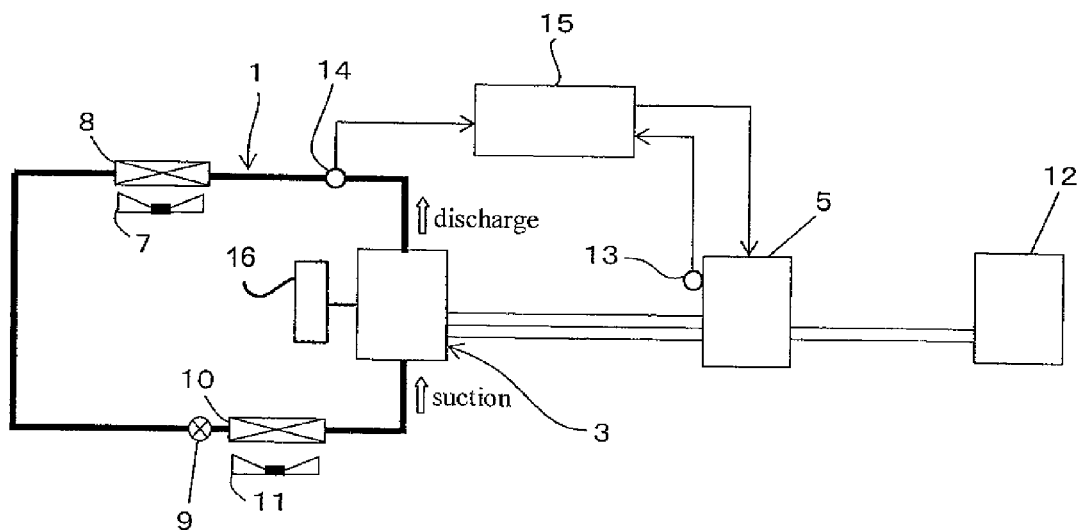
FIG. 1 is a schematic framework view showing an example of a framework of a refrigeration circuit of an air conditioning system for vehicles in which an electric compressor control device according to the present invention can be applied.

EXPLANATION OF SYMBOLS 1,2: refrigeration circuit
3,4: electric compressor
5,6: inverter
7: fan
8: condenser
9: expansion valve
10: evaporator
11: blower
12: power source
13: temperature sensor
14: pressure sensor
15: control device

BEST MODE FOR CARRYING OUT THE INVENTION

Hereinafter, desirable embodiments of the present invention will be explained referring to the figures.

Figure 2:
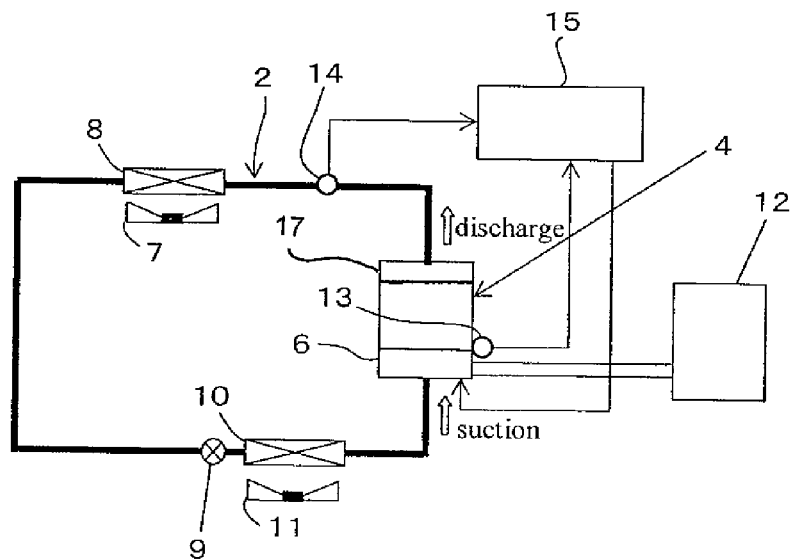
FIG. 2 is a schematic framework view showing another example of a framework of a refrigeration circuit of an air conditioning system for vehicles in which an electric compressor control device according to the present invention can be applied.

FIG. 1 and FIG. 2 shows an example of a framework of a refrigeration circuit of an air conditioning system, specifically a refrigeration circuit of an air conditioning system for vehicles in which an electric compressor control device according to the present invention can be applied. In refrigeration circuits 1,2 of FIG. 1 and FIG. 2, electric compressors 3,4 (including a hybrid-type compressor as well as a general electric compressor) is provided. FIG. 1 shows an example where inverter 5 is placed separately from electric compressor 3. FIG. 2 shows an example where inverter 6 is incorporated integrally into a compressor to construct inverter integrated electric compressor 4. In refrigeration circuits 1,2, refrigerant is sucked into electric compressors 3,4, and the high pressured refrigerant which is sucked and compressed is discharged from electric compressors 3,4. At the downstream side of electric compressor 3,4 (discharge side of the compressor), condenser 8 having fan 7 which refrigerates and condenses high pressured refrigerant compressed in compressors 3,4 is provided. At the downstream side of condenser 8, expansion valve 9 which decompresses and expands the refrigerant condensed and refrigerated is provided, and further downstream, evaporator 10 which evaporates refrigerant decompressed and expanded is provided. Evaporator 10 can, for example, perform heat exchange with the air sent by blower 11 provided in an air conditioning duct (not shown), so as to send the refrigerated air as a conditioned air for refrigeration into a vehicle interior, for example.

Inverters 5,6 are supplied with electricity from DC power supply 12, and predetermined pseudo-AC current transformed from DC current is sent as phase current to drive motors 16,17 which may be external to or incorporated in electric compressors 3,4. The temperature of the installation portion for inverters 5,6 is detected by temperature sensor 13 provided in the installation portion arbitrarily, so that the detected temperature is used as temperature corresponding to the temperature of the semiconductor switching elements provided in inverters 5,6 for calculation of the permitted current value of the semiconductor switching elements, as described below. Temperature sensor 13 can be provided in inverter 5 for the embodiment shown in FIG. 1, and alternatively in the embodiment shown in FIG. 2, can be provided not only in inverter 6 but also on the exterior surface of compressor 4 corresponding to it.

Further, between compressors 3,4 and condenser 8 in refrigeration circuits 1,2, pressure sensor 14 to detect the pressure of the high-pressure side refrigerant which is discharged from compressors 3,4 is provided. The high-pressure side pressure detected by pressure sensor 14 is used to calculate the starting current value which is required for startup of compressors 3,4 as described later.

Signals of the semiconductor switching element temperature detected by temperature sensor 13 and the high-pressure side pressure detected by pressure sensor 14 are input into control device 15, so as to be used for calculation of the permitted current value and the starting current value, and according to the calculation in control device 15, the output to inverters 5,6 for controlling inverters 5,6 is controlled to make electric compressors 3,4 start.

Figure 3:
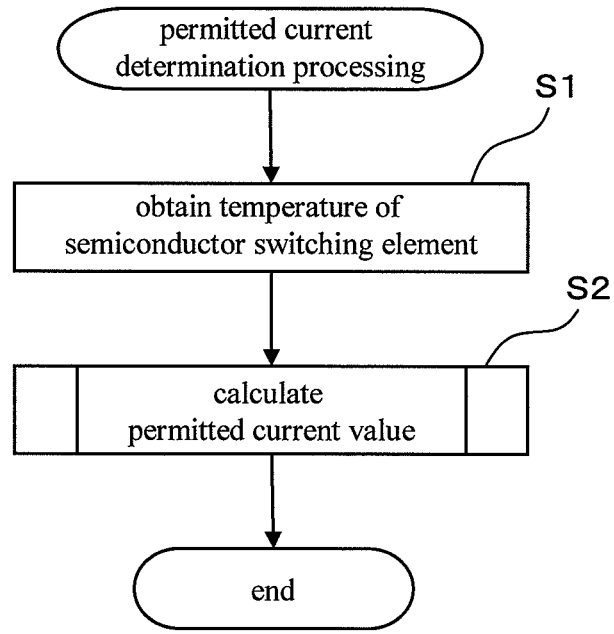
FIG. 3 is a flow chart showing an example of a processing in which a permitted current of an electric compressor control device according to the present invention is determined.
Figure 4:
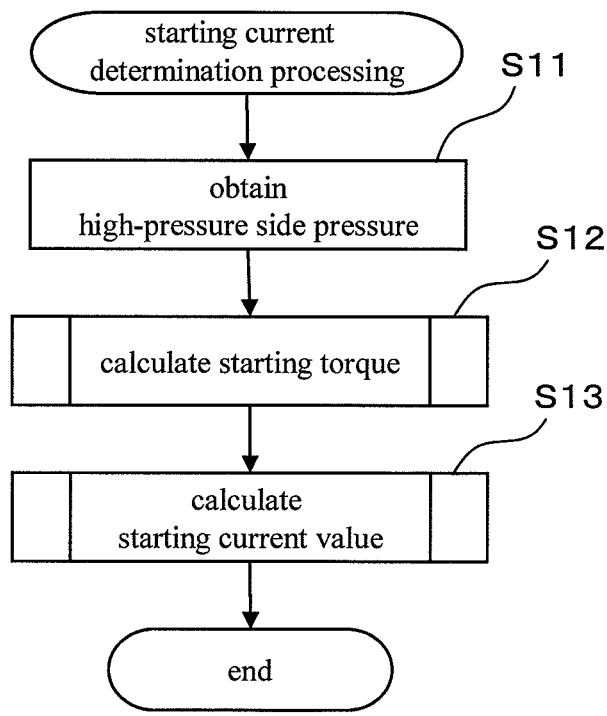
FIG. 4 is a flow chart showing an example of a processing in which a starting current of an electric compressor control device according to the present invention is determined.
Figure 5:
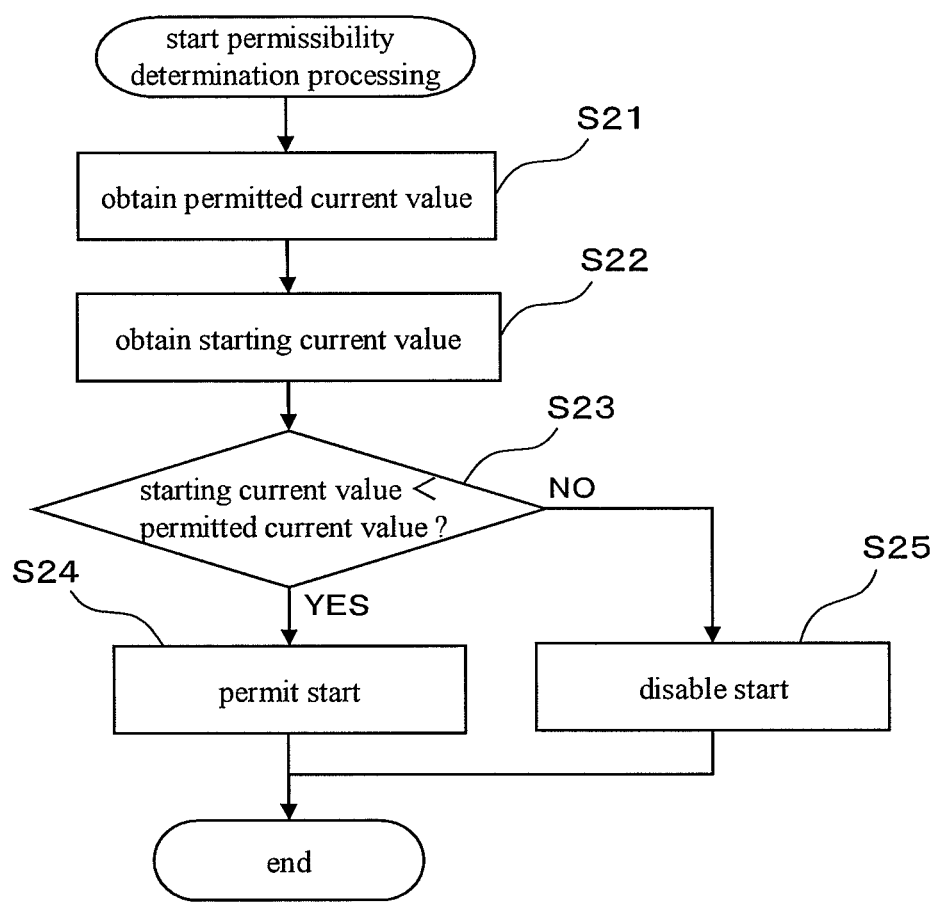
FIG. 5 is a flow chart showing an example of a start permissibility determination processing in an electric compressor control device according to the present invention.

The starting control of the compressor in the present invention is performed as shown in FIG. 3-FIG. 5, for example. FIG. 3 shows a flow chart of a permitted current determination processing, in which the temperature of the semiconductor switching element is obtained from the temperature detected by temperature sensor 13 (Step S1), and the permitted current value of the semiconductor switching element having correlation with that temperature is calculated from the obtained temperature of the semiconductor switching element (Step S2).

FIG. 4 shows a flow chart of a starting current determination processing, in which, the high-pressure side pressure detected by pressure sensor 14 is obtained (Step S11), and the starting torque required for the startup of compressors 3,4 having correlation with the obtained high-pressure side pressure is calculated from that pressure (Step S12), and being based on that, the starting current value required for starting of compressors 3,4 is calculated (Step S13).

FIG. 5 shows a flow chart of a start permissibility determination processing, in which the semiconductor switching element's permitted current value calculated as described above and the starting current value required for the startup of electric compressors 3,4 are obtained (Step S21, S22), so that the magnitude relation between the starting current value and the permitted current value is determined (Step S23). In the determination of Step S23, if the starting current value is lower than the permitted current value it is determined to permit the startup (Step S24), but if the starting current value is not lower than the permitted current value it is determined not to permit the startup (Step S25). And, compressors 3,4 are started only if it is determined to permit the startup, but compressors 3,4 are kept stopped if it is determined not to permit the startup. The actual starting electric current in a case that compressors 3,4 are started may be either the above calculated starting current or the above calculated permitted current. Because it has been determined to permit the startup in such a case, compressor 3,4 can be surely started by either current of those.

Thus, the startup is started only when the electric current applied into the semiconductor switching element is surely less than the permitted current value, but when it is beyond the permitted current value it is not started on standby, so that no semiconductor switching element having rather great electric current capacity is required to be used at all. Consequently, a small and inexpensive semiconductor switching element can be used, and therefore, an inverter integrated-type compressor itself or an inverter separate-type compressor apparatus can be reduced in size and cost.

INDUSTRIAL APPLICATIONS OF THE INVENTION

The electric compressor control device according to the present invention is applicable to any electric compressor having an inverter.

The invention claimed is:

1. An electric compressor control device which controls an electric power supply from an inverter having a semiconductor switching element to an electric compressor having a built-in motor, comprising:
   a temperature sensor disposed on an exterior surface of the electric compressor;
   means for calculating a starting current value required for starting said compressor from a pressure measured at a discharge side of said compressor and upstream of a condenser, said starting current value having a correlation with said pressure;
   means for calculating a permitted current value of said semiconductor switching element only from a temperature of the inverter determined by the temperature sensor, said permitted current value having a correlation with said temperature; and
   a start permissibility determination means for determining whether to permit a start of said compressor by comparison between said calculated starting current value for said compressor and said permitted current value for said semiconductor switching element, wherein said inverter is incorporated integrally into said electric compressor, and wherein said electric compressor is a compressor which is incorporated into a refrigeration circuit of an air conditioning system for vehicles.

2. The electric compressor control device according to claim 1, wherein said electric compressor is a hybrid-type compressor which is driven selectively or simultaneously by said built-in motor and an external drive source other than said built-in motor.

3. The electric compressor control device according to claim 1, wherein said compressor is started by an electric current of said calculated starting current value when said start permissibility determination means determines to permit said start of said compressor.

4. The electric compressor control device according to claim 1, wherein said compressor is started by an electric current of said calculated permitted current value when said start permissibility determination means determines to permit said start of said compressor.

* * * * *